US012585353B2

(12) United States Patent
Ponkala et al.

(10) Patent No.: US 12,585,353 B2
(45) Date of Patent: Mar. 24, 2026

(54) TRACKPAD ACTUATOR CONFIGURATIONS FOR INPUT DEVICE

(71) Applicant: Apple Inc., Cupertino, CA (US)

(72) Inventors: Joonas I. Ponkala, San Carlos, CA (US); Ryan P. Brooks, Portola Valley, CA (US); Scott J. McEuen, Morgan Hill, CA (US); Austin Appel, Cupertino, CA (US); Henry N. Tsao, Woodside, CA (US); James E. Wright, San Jose, CA (US); Christopher I. Owen-Elia, San Francisco, CA (US); Sanju Bose, Boulder Creek, CA (US); Anna C. Widder, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/956,841

(22) Filed: Nov. 22, 2024

(65) Prior Publication Data

US 2025/0341911 A1 Nov. 6, 2025

Related U.S. Application Data

(60) Provisional application No. 63/641,937, filed on May 2, 2024.

(51) Int. Cl.
*G06F 3/041* (2006.01)
*G06F 3/02* (2006.01)

(52) U.S. Cl.
CPC ........ *G06F 3/0414* (2013.01); *G06F 3/04164* (2019.05); *G06F 3/0213* (2013.01)

(58) Field of Classification Search
CPC ... G06F 3/0414; G06F 3/04164; G06F 3/0213
See application file for complete search history.

(56) References Cited

U.S. PATENT DOCUMENTS

| | | | |
|---|---|---|---|
| 9,772,688 B2 | 9/2017 | Patel et al. | |
| 11,402,871 B1* | 8/2022 | Berliner | G06F 3/04886 |
| 2016/0162030 A1* | 6/2016 | Patel | G06F 1/169 |
| | | | 345/173 |
| 2016/0259411 A1* | 9/2016 | Yoneoka | G06F 3/03547 |
| 2018/0260016 A1* | 9/2018 | Stevenson | G06F 1/3262 |
| 2019/0339776 A1* | 11/2019 | Rosenberg | G06F 3/045 |
| 2020/0150767 A1* | 5/2020 | Karimi Eskandary | |
| | | | H04M 1/0202 |
| 2024/0319814 A1* | 9/2024 | Wang | G06F 3/04166 |

* cited by examiner

*Primary Examiner* — Afroza Chowdhury
(74) *Attorney, Agent, or Firm* — Dorsey & Whitney LLP

(57) ABSTRACT

Input devices for electronic devices including trackpads, such as keyboard, and systems that include input devices in communication with electronic devices are disclosed. In an example, an input device includes a trackpad including a touch surface, and an actuator configured to supply haptic feedback to the trackpad. The actuator is disposed outside of a periphery of the touch surface in a view perpendicular to the touch surface. The actuator is disposed to a side of the touch surface in a direction parallel to a longitudinal axis of the touch surface.

21 Claims, 9 Drawing Sheets

100

102

TRACKPAD ACTUATOR CONFIGURATIONS FOR INPUT DEVICE

CROSS-REFERENCE TO RELATED APPLICATION(S)

This application claims priority to U.S. Provisional Patent Application No. 63/641,937, filed 2 May 2024, and entitled "INPUT DEVICE INCLUDING TRACKPAD," the entire disclosure of which is hereby incorporated by reference.

FIELD

The present disclosure relates generally to haptic feedback input devices, and more particularly, to trackpads, attachments of components of a trackpad, and an electronic system for powering components of a trackpad.

BACKGROUND

Electronic devices, such as portable computers, generally include trackpads for receiving user input. Trackpads can be provided in the form of integrated components that are provided in the housing of an electronic device, or can be provided in the form of stand-alone components that are connected to electronic devices. For example, stand-alone keyboards that include trackpads can be connected to electronic devices such as tablet computers.

Trackpads typically include a rectangular touch surface that monitors the position of a user's finger or another external object. A user may interact with a trackpad by controlling the position of the user's fingertip on the touch surface. The trackpad may be used to control the position of a cursor on a display screen of an electronic device or to take other suitable actions. Trackpads can use multi-touch arrangements such that the movement of one or more fingers across the touch surface can be interpreted as a particular command. For example, a swipe of a user's fingertips across the touch surface can serve as a gesture that directs an electronic device to advance through a list of items. Users can also provide force-based input, often referred to as clicks, when applying a threshold amount of pressure to the trackpad, and the trackpad can provide feedback, typically haptic feedback, to indicate to the user the registry of the force-based input.

Trackpads are generally incorporated into electronic devices that include internal batteries. The internal batteries can be used to power actuators in the trackpads to supply the haptic feedback to the trackpads. The internal batteries may have relatively large thicknesses, which require relatively large thicknesses of housings. This allows for trackpads with relatively large thicknesses to be included in the housings. However, it can be desirable to provide trackpads in packages that do not include internal batteries or that are significantly thinner than conventional haptic-trackpad-bearing devices. There is a constant need for improvements to trackpad and other input device technologies.

SUMMARY

One aspect of the present disclosure relates to an input device that includes a trackpad including a touch surface and an actuator configured to supply haptic feedback to the trackpad. The actuator can be disposed outside of a periphery of the touch surface in a view perpendicular to the touch surface. The actuator can be disposed to a side of the touch surface in a direction parallel to a longitudinal axis of the touch surface.

In some examples, the actuator can be configured to supply the haptic feedback to the trackpad by generating a magnetic field that attracts an attraction plate of the trackpad. The attraction plate can extend from within the periphery of the touch surface in the view perpendicular to the touch surface to outside of the periphery of the touch surface in the view perpendicular to the touch surface. The attraction plate can be rigidly fixed to a touch assembly of the trackpad and the touch assembly can include the touch surface.

In some examples, the input device can further include a plurality of keys and a touch assembly. The touch assembly can include the touch surface and a logic board disposed within the periphery of the touch surface in the view perpendicular to the touch surface. The logic board can be connected to the plurality of keys and the actuator.

In some examples, the input device can further include a housing. The trackpad can be positioned in an opening in a top wall of the housing. The actuator can be attached to an inner surface of the top wall of the housing by an adhesive layer.

In some examples, the actuator can include an electromagnetic actuator including a coil surrounding a core. The core can include three or fewer laminated layers of silicon steel.

Another aspect of the present disclosure relates to a keyboard that includes a keyboard housing and a trackpad in the keyboard housing. The trackpad can include a touch assembly disposed in an opening in a top case of the keyboard housing and an actuator attached to an inner surface of the top case of the keyboard housing by a first adhesive layer. The actuator can be configured to apply a force to the touch assembly to supply haptic feedback to the touch assembly.

In some examples, the keyboard can further include a second adhesive layer attached to the actuator opposite the first adhesive layer. In some examples, the second adhesive layer can be separated from a back case of the keyboard housing by a gap.

In some examples, the trackpad can further include a beam plate between the touch assembly and a back case of the keyboard housing. The beam plate can be at least partially attached to the back case of the keyboard housing by an adhesive material. In some examples, the trackpad can further include a beam plate that includes a first C-shaped beam plate portion attached to the keyboard housing and a second C-shaped beam plate portion attached to the keyboard housing and separated from the first C-shaped beam plate portion.

In some examples, the trackpad can further include an attraction plate rigidly fixed to the touch assembly. The actuator can be configured to apply a force to the attraction plate to supply the haptic feedback to the touch assembly. In some examples, the keyboard can further include a spacebar. The actuator can be configured to apply a magnetic field to the touch assembly in a direction parallel to a longitudinal axis of the spacebar.

In some examples, the keyboard housing can include a key portion including a plurality of keys, a first edge proximal the trackpad opposite the key portion, a second edge angled to and contiguous with the first edge, and a palm rest portion between the trackpad and the second edge and between the key portion and the first edge. The actuator can be attached to the keyboard housing in the palm rest portion of the keyboard housing.

In yet another aspect of the present disclosure, a keyboard is provided that includes a trackpad, a capacitor bank, an electrical interface connected to the capacitor bank and operable to supply power to the capacitor bank at a first rate, and an actuator connected to the capacitor bank. The actuator can be operable to provide haptic feedback to the trackpad and can be configured to draw power from the capacitor bank at a second rate greater than the first rate.

In some examples, the keyboard can further include a plurality of keys. The trackpad can include a touch assembly. The touch assembly can include a logic board. The logic board can include a single controller for both the actuator and the plurality of keys.

In some examples, the keyboard can further include a key area including a plurality of keys. The capacitor bank can be disposed between the electrical interface and the key area.

In some examples, the trackpad can include a strain gauge to detect input provided to an input surface of the trackpad. The keyboard can be configured to output a signal to the electrical interface based on the input detected via the strain gauge. The actuator can be configured to provide the haptic feedback in response to the input detected via the strain gauge.

In some examples, the electrical interface can be configured to transfer power from an external device to the capacitor bank, transfer data between the keyboard and the external device, and provide magnetic coupling to the external device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
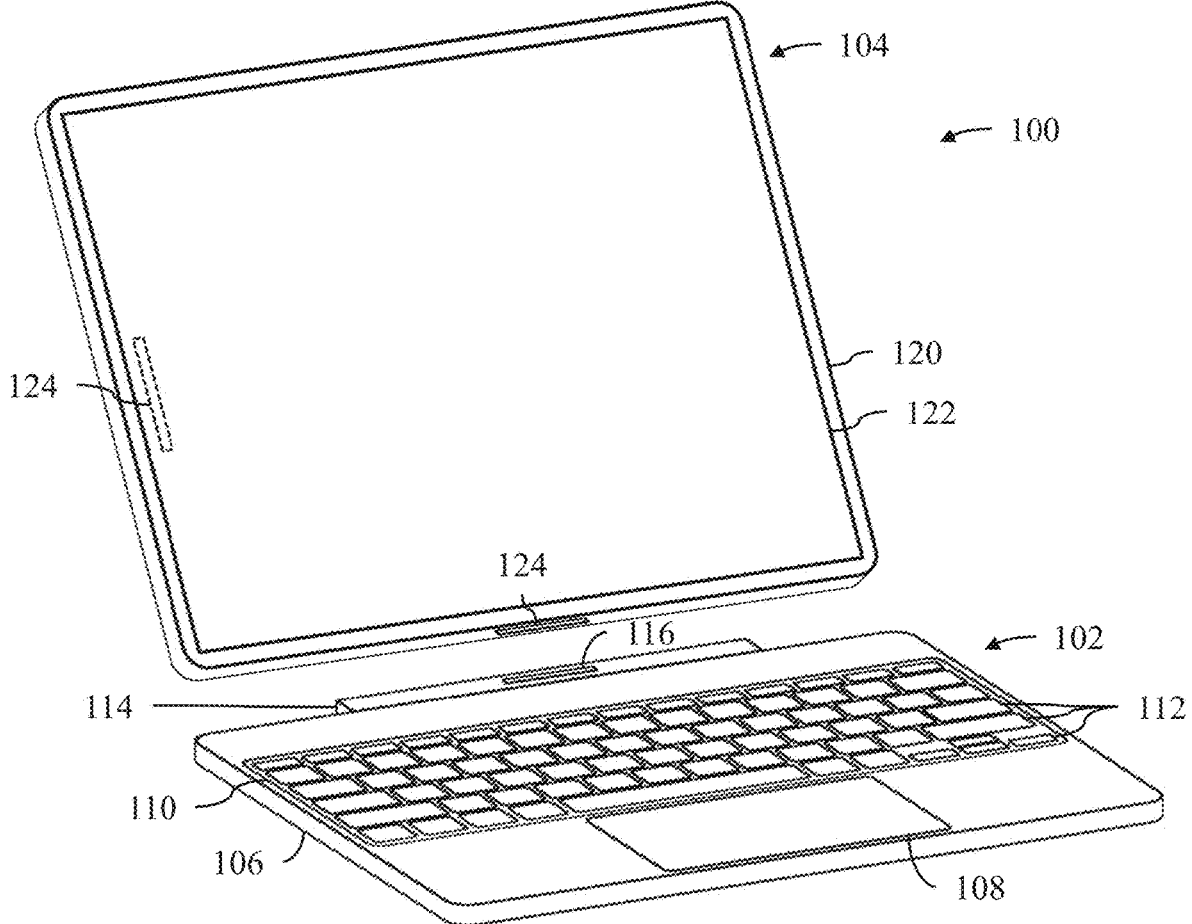
FIG. 1 shows a perspective view of an input device and a computing system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to input devices for electronic devices. More particularly, the present disclosure relates to an input device for an electronic device that includes a trackpad that supplies haptic feedback. The trackpad can include an actuator that is disposed to a side of a touch surface of the trackpad. This allows for the trackpad to have a reduced thickness. The trackpad can include a beam plate through or upon which components of the trackpad, including the actuator, are mounted. The beam plate and/or the actuator can be attached to a housing of the input device using adhesive foams and/or other adhesive materials (e.g., a pressure-sensitive adhesive, glue, flexible polymer/resin, compressible silicone layer, similar materials, or combinations thereof). This attachment can be semi-rigid, and can be used to maintain tolerances within the trackpad, while accommodating some movement and bending of the housing of the input device. The components of the input device, including the trackpad, can be powered by a connection to an external electronic device. The connection can charge capacitors of the input device, which can then supply power to the components of the input device. This arrangement can allow for the trackpad to draw power from the capacitors at a greater rate than the connection to the external electronic device supplies, allowing for the trackpad to intermittently or momentarily supply greater haptic feedback forces than if the actuator were only provided power from the connection to the external electronic device (or a connection to another external source). The input device can include a plurality of keys, and a logic board for both the trackpad and the plurality of keys can be included in a touch assembly of the trackpad. This reduces costs and improves space efficiency in the input device by reducing the number of logic boards provided for the input device.

These and other embodiments are discussed below with reference to FIGS. 1 through 10C. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a perspective view of a system 100 that can implement, or can be used to implement, embodiments of the present disclosure. The system 100 includes an input device 102 (also referred to as a keyboard, an external keyboard, or a computer accessory) in electrical communication with a computing system 104 (also referred to an electronic device, a tablet computer, a computer, or a computing device). The input device 102 shown in FIG. 1 and discussed throughout the present disclosure is an external keyboard (e.g., a keyboard that can be connected to and disconnected or removed from the computing system 104) that includes a trackpad. However, the keyboard of the present disclosure is merely one representative example of a device that can be used in conjunction with the systems and methods disclosed herein. The input device 102 can correspond to any form of an input device that includes a trackpad, such as a standalone trackpad, an integrated keyboard (e.g., a keyboard that is a built-in component of the computing system 104) or the like. The computing system 104 shown in FIG. 1 is a tablet computer. The tablet computer of FIG. 1 is merely one representative example of a device that can be used in conjunction with the systems and methods disclosed herein. The computing system 104 can correspond to any form of an electronic device, including a cellular telephone, a smart phone, a portable media player, a media storage device, a portable digital assistant ("PDA"), a tablet computer, a computer, a laptop computer, a mobile communication device, a GPS unit, a remote control device, a smartwatch, or another electronic device.

The input device 102 can include a housing 106, a trackpad 108, a keyboard portion 110 (also referred to as a key area, a key portion, or a keyboard area) including a plurality of keys (e.g., 112), and an interface portion 114 including an electrical interface 116. The trackpad 108 and the keys 112 can be disposed in openings in a top wall or top case of the housing 106 of the input device 102. The top case of the housing 106 can be a top portion or wall of the input device 102 that defines a top surface of the input device 102, which is a surface that includes the trackpad 108 and the keys 112. The top case of the housing 106 can be opposite a bottom surface of the housing 106 on which the input device 102 is configured to sit. In examples in which the input device 102 is a built-in component of the computing system 104, the top case can refer to a top case of a keyboard portion of the computing system 104, rather than a portion of the computing system 104 that includes a display assembly. The keyboard portion 110 can be optionally omitted from the input device 102, wherein the input device 102 can define a trackpad 108 in the housing 106 without a keyboard or similar key- or button-based input device in the housing 106. The interface portion 114 can provide an electrical interface (and may also provide a physical/mechanical interface) between the input device 102 and the computing system 104. For example, the interface portion 114 can include a folding stand, a pedestal, a slot, or other components that can position and angle the computing system 104 relative to the input device 102. The interface portion 114 can include magnetic components that retain the computing system 104 in a desired position. The interface portion 114 can be adjustable between different positions, such as to retain the computing system 104 at varying angles and positions relative to the input device 102. The electrical interface 116 can include a flush-mount interface (e.g. with electrical contacts flush with a wall of the interface portion 114), spring-loaded electrical contacts (e.g., pogo pins), electrical ports, conductive jacks, conductive sockets, other suitable electrical contacts or connections, or combinations thereof. The electrical interface 116 can include magnetic components, and can magnetically couple the input device 102 to the computing system 104.

The computing system 104 can include a housing 120, a display assembly 122, and one or more electrical interfaces 124. The housing 120 can be referred to as an enclosure, a case, or the like. The housing 120 can be formed from materials such as plastic, glass, ceramics, fiber composites, metals (e.g., stainless steel, aluminum, titanium, combinations or alloys thereof, or the like), other suitable materials, combinations thereof, or the like. The housing 120 can receive the display assembly 122, and the display assembly 122 can be configured to drive visual display content. The electrical interfaces 124 can provide connections between the computing system 104 and the input device 102. An electrical interface 124 can be provided on a back wall of the housing 120 (e.g., opposite the display assembly 122), along a longitudinal sidewall of the housing 120 (illustrated in FIG. 1), along a lateral sidewall of the housing 120, or the like. Any number of the electrical interfaces 124 can be included in the computing system 104. The electrical interfaces 124 can include flush-mount interfaces (e.g. with electrical contacts flush with the walls of the housing 120), spring-loaded electrical contacts (e.g., pogo pins), electrical ports, other suitable electrical contacts or connections, or the like, in a manner compatible with interfacing with the electrical interface 116 of the input device 102. The electrical interfaces 124 can include magnetic components, and can magnetically couple the computing system 104 to the input device 102.

The input device 102 and the computing system 104 can be in electrical communication with one another through the electrical interface 116 of the input device 102 and the electrical interface 124 of the computing system 104. In some examples, the electrical interfaces 116, 124 can be direct electrical interfaces. For example, the electrical interfaces 116, 124 can include contacts disposed on external surfaces of the input device 102 and the computing system 104. The contacts can include a flush-mount contact on one of the input device 102 or the computing system 104 and a spring-loaded contact on the other of the input device 102 or the computing system 104. Magnetic components can be included in the electrical interfaces 116, 124 to align the electrical interfaces 116, 124 with one another and retain the electrical interfaces 116, 124 relative to one another. In some examples, the electrical interfaces 116, 124 can be indirect interfaces, and can include ports that allow for a cable to be connected between the input device 102 and the computing system 104. The electrical interfaces 116, 124 can be used to supply power from the computing system 104 to the input device 102, and to transfer data between the input device 102 and the computing system 104.

As used herein, parts in "electrical communication" with each other are configured to exchange electrical signals, directly or indirectly, between each other, whether unidirectionally or bidirectionally. An input device (e.g., the input device 102) can be said to be in electrical communication with a computing system (e.g., the computing system 104) if the computing system is using signals generated by the input device or if the computing system is using signals reliant upon or derived at least in part on the signals generated by the input device. For example, the input device 102 can be in electrical communication with the computing system 104 via electrical interfaces (e.g., the electrical interfaces 116, 124 or similar components) of the input device 102 and the computing system 104. A sensor can be said to be in electrical communication with a processor or controller device if the processor is using signals generated by the sensor, or if the processor is using signals/measurements/values reliant upon, or derived at least in part on, the signals generated by the sensor. An actuator can be said to be in electrical communication with a processor or controller device if the actuator is using signals generated by, reliant upon, or derived at least in part on signals generated by or provided from the processor.

Figure 2:
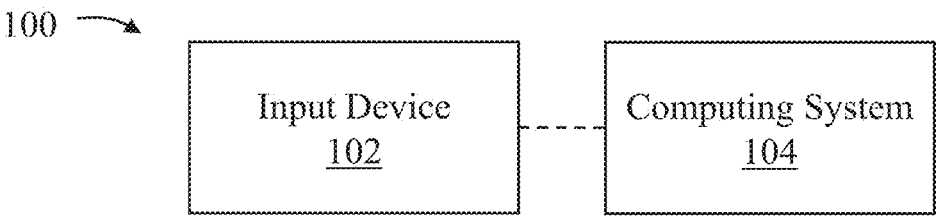
FIG. 2 shows a block diagram of an input device and a computing system.

FIG. 2 shows a block diagram of the system 100 of FIG. 1. As illustrated in FIG. 2, the input device 102 can be in electrical communication with the computing system 104. As described above, the input device 102 and the computing system 104 can be in electrical communication through the electrical interfaces 116, 124. The electrical interfaces 116, 124 can supply power from the computing system 104 to the input device 102, and can provide data transfer between the input device 102 and the computing system 104. Various sensors can be included in the input device 102 for allowing a user to provide input to the computing system 104 through the input device 102. For example, the keys 112 and the trackpad 108 of the input device 102 can be used to provide different types of input from the input device 102 to the computing system 104. The inputs from the input device 102 can be used to perform commands or actions with the computing system 104. The input device 102 and/or the computing system 104 can provide feedback to users in response to the inputs from the input device 102. For example, the trackpad 108 can include an actuator, which can be configured to supply haptic feedback to a user in response to inputs provided through the trackpad 108.

Figure 3:
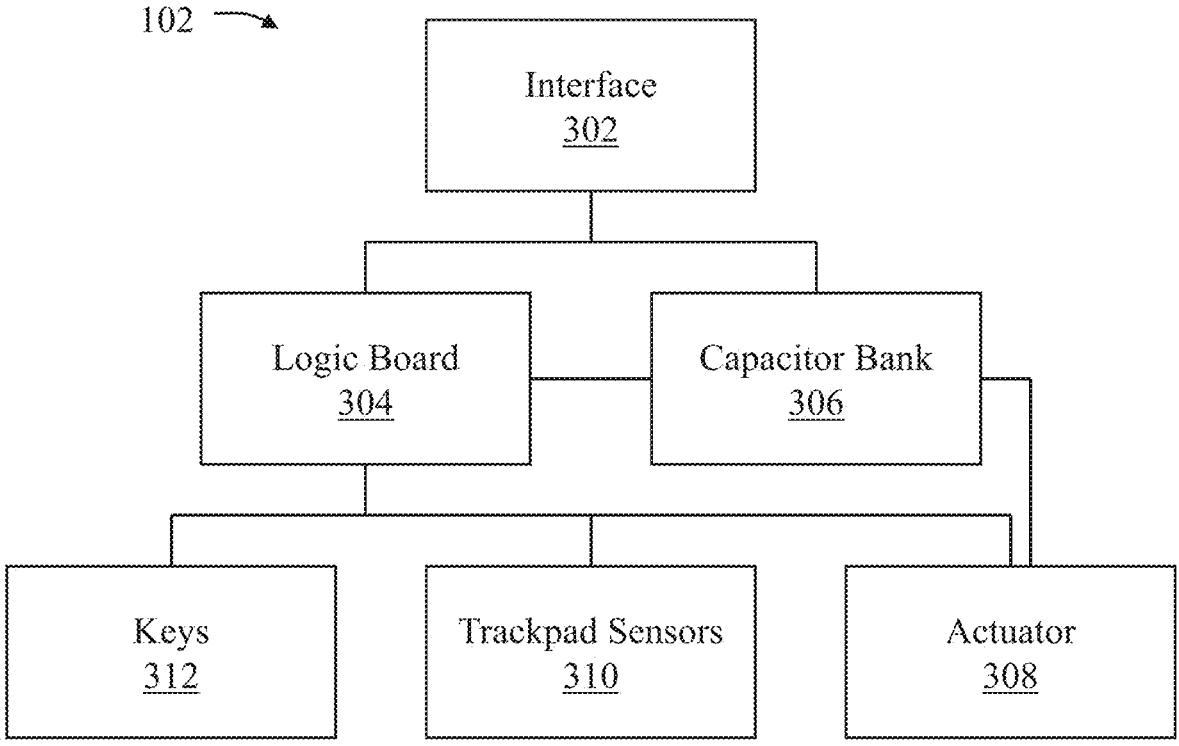
FIG. 3 shows a block diagram of an input device.

FIG. 3 shows a block diagram of the input device 102. In various embodiments, the input device 102 can include various sets and subsets of the components shown in FIG. 3. Thus, FIG. 3 shows a variety of components that can be included in various combinations and subsets based on the operations and functions performed by the input device 102 in different embodiments. The input device 102 can include an interface 302, a logic board 304, a capacitor bank 306, an actuator 308, trackpad sensors 310, and a plurality of keys 312. Various components of the input device 102 can be connected to one another, such as through wired connections, via one or more buses, or the like (as shown for example by the example connection lines in FIG. 3).

The interface 302 can be used to connect the input device 102 to an external device, such as the computing system 104. The interface 302 can include any of the electrical interfaces discussed above. The interface 302 can be the same as or similar to the electrical interface 116 discussed above with respect to FIG. 1. The interface 302 can be used to transfer data between the logic board 304 and the external device, and can be used to supply power to the capacitor bank 306 and any other components of the input device 102. The input device 102 can be free from internal batteries, and can be powered through the interface 302. The interface 302 can charge the capacitor bank 306 or other energy storage device contained by and connected to the input device 102.

The logic board 304 can be a controller for the keys 312 and/or a trackpad of the input device 102 (e.g., for the trackpad sensors 310 and the actuator 308). In other words, the logic board 304 can execute instructions and carry out operations associated with the keys 312 (e.g., with sensors of the keys 312), the trackpad sensors 310, and the actuator 308. The logic board 304 can generate user input data that can be sent to an external device (e.g., the computing system 104) through the interface 302 based on user manipulation of the keys 312 and the trackpad of the input device 102 (e.g., detected by the trackpad sensors 310). The logic board 304 can generate haptic feedback commands for the actuator 308 based on user manipulation of the trackpad detected by the trackpad sensors 310. The input device 102 can include a single logic board 304 that is a controller for the keys 312, the trackpad sensors 310, and the actuator 308. The logic board 304 can be included in a touch assembly of the trackpad of the input device 102. Providing a single logic board that provides control for the keys 312, the trackpad sensors 310, and the actuator 308 can reduce the footprint of logic boards in the input device 102 and can reduce the cost of logic boards in the input device 102. In some examples, the input device 102 can include multiple logic boards 304, which can provide control for various components of the input device 102. The logic board 304 can include one or more processors, controllers, memory, and the like, which can implement the functions of the logic board 304. The logic board 304 may include application software to implement various functions associated with the input device 102.

The capacitor bank 306 can be used to store electrical energy, which can be used by components of the input device 102. The capacitor bank 306 can include a number of capacitors, which can be charged by the interface 302 and discharged by the components of the input device 102. The number of capacitors included in the capacitor bank 306 can be determined based on intermittent power requirements of the components of the input device 102. For example, the actuator 308 can use relatively large power draws, but can be used intermittently. The capacitor bank 306 can be provided to supply power for the large power draws of the actuator 308, and can be charged through the interface 302 when the actuator 308 is not active. The stored electrical energy in the capacitor bank 306 allows for the actuator 308 to draw power from the capacitor bank 306 at a rate greater than the interface 302 is configured to supply. This allows the actuator 308 to provide larger haptic feedback forces, while using a low-power interface 302 and without including a battery in the input device 102. In some embodiments, the capacitor bank 306 can be replaced by a battery or similar electrical energy storage system, particularly in embodiments where the input device 102 is implemented in thicker, larger housings, such as in a notebook computer chassis, a desktop input device (e.g., standalone trackpad), or other device not intended as an externally-connected accessory for a portable computing system. Capacitors can enable a small profile, lightweight input device 102, due to their reduced size and energy storage capacity as compared to batteries and other larger storage devices.

The keys 312 can be keys of a keyboard that allow a user to provide input to the input device 102. The keys 312 can be the same as or similar to the keys 112, discussed above with respect to FIG. 1. The trackpad sensors 310 can include various sensors that track force and position of a user's touch to the trackpad of the input device 102. For example, the trackpad sensors 310 can include one or more of a position sensor, a touch sensor, and a force sensor. The trackpad sensors 310 can include one or more of a strain gauge, a capacitive sensor, a resistive sensor, an optical sensor, similar devices, and combinations thereof. The actuator 308 can be used to supply haptic feedback to the trackpad of the input device 102. The actuator 308 can be actuated in response to signals from the logic board 304. The actuator 308 can be actuated in response to the logic board 304 detecting user inputs to the trackpad through the trackpad sensors 310. The actuator 308 can include a magnetic actuator (e.g., an electromagnetic actuator), which applies a magnetic field to the touch assembly of the trackpad when activated. In some examples, the actuator 308 can be a linear actuator, another mechanical actuator, an electrical actuator, or the like. See also actuator 308 and related components discussed below.

Figure 4:
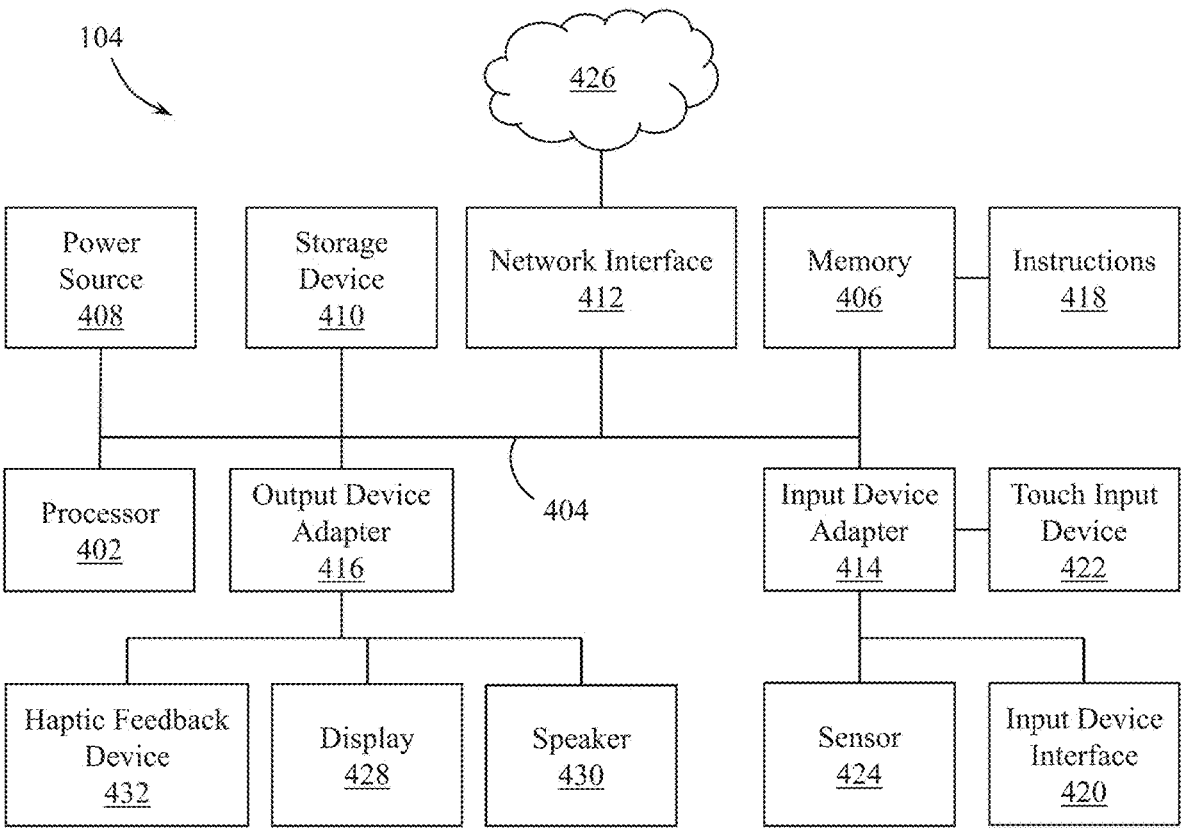
FIG. 4 shows a block diagram of a computing system.

FIG. 4 shows a block diagram of the computing system 104. In various embodiments, the computing system 104 can include various sets and subsets of the components shown in FIG. 4. Thus, FIG. 4 shows a variety of components that can be included in various combinations and subsets based on the operations and functions performed by the computing system 104 in different embodiments. The computing system 104 can include a central processing unit (CPU) or processor 402 connected via a bus 404 for electrical communication to a memory 406, a power source 408, an electronic storage device 410, a network interface 412, an input device adapter 414, and an output device adapter 416. For example, one or more of these components can be connected to each other via a substrate (e.g., a printed circuit board or other substrate) supporting the bus 404 and other electrical connectors providing electrical communication between the components. The bus 404 can include a communication mechanism for communicating information between parts of the computing system 104.

The processor 402 can be a microprocessor or similar device configured to receive and execute a set of instructions 418 stored by the memory 406. The memory 406 can be referred to as main memory, such as random access memory (RAM) or another dynamic electronic storage device for storing information and instructions to be executed by the processor 402. The memory 406 can also be used for storing temporary variables or other intermediate information during execution of instructions executed by the processor 402. The processor 402 can include one or more processors or controllers, such as, for example, a CPU for the computing system 104 and a touch controller or similar sensor or I/O interface used for controlling and receiving signals from an input device (e.g., the input device 102 through an input device interface 420), a touch input device 422, sensors 424, or the like. The power source 408 can include a power supply capable of providing power to the processor 402 and other components connected to the bus 404, such as a connection to an electrical utility grid or a battery system.

The storage device 410 can include read-only memory (ROM) or another type of static storage device coupled to the bus 404 for storing static or long-term (i.e., non-dynamic) information and instructions for the processor 402. For example, the storage device 410 can include a magnetic or optical disk (e.g., a hard disk drive (HDD)), a solid state memory (e.g., a solid state disk (SSD)), or a comparable device.

The instructions 418 can include information for executing processes and methods using components of the computing system 104 and components of the input device 102. Such processes and methods can include, for example, the methods described in connection with other embodiments elsewhere herein. The instructions 418 can include any methods for performing actions or commands on the computing system 104 in response to inputs from the input device 102.

The network interface 412 can include an adapter for connecting the computing system 104 to an external device via a wired or wireless connection. For example, the network interface 412 can provide a connection to a computer network 426 such as a cellular network, the Internet, a local area network (LAN), a separate device capable of wireless communication with the network interface 412, other external devices or network locations, and combinations thereof. In one example embodiment, the network interface 412 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 426 can be considered part of the computing system 104. In some cases, a network device can be considered connected to, but not a part of, the computing system 104. In some examples, the computing system 104 can communicate with the input device 102 through the input device interface 420. However, in some examples, the input device 102 can include a network interface the same as or similar to the network interface 412, and the computing system 104 can communicate with the input device 102 through a connection between the network interface 412 and the network interface of the input device 102.

The input device adapter 414 can be configured to provide the computing system 104 with connectivity to various input devices such as, for example, the input device interface 420, the touch input device 422 (e.g., a display 428 of the computing system 104, which can be a touch-sensitive display), the sensors 424, related devices, and combinations thereof. The input device interface 420 can be used to connect the computing system 104 to an input device, such as the input device 102. The input device 102 can be used to provide user input to the computing system 104 through the input device interface 420. As described above, the input device interface 420 can include a direct connection (e.g., through electrical interfaces 116, 124), or an indirect connection (e.g., through a cable or the like). The input device interface 420 can be the same as or similar to the electrical interface 124, discussed above with respect to FIG. 1. In some examples, the input device adapter 414 is connected to the touch input device 422 and traces thereof to detect a position of touches or gestures on the display 428, e.g., through sensing changes in capacitance or applied forces. The sensors 424 can be used to detect physical phenomena in the vicinity of the computing system 104 (e.g., light, sound waves, electric fields, forces, vibrations, etc.) and convert those phenomena to electrical signals.

The output device adapter 416 can be configured to provide the computing system 104 with the ability to output information to a user, such as by providing visual output using one or more displays 428, by providing audible output using one or more speakers 430, or providing haptic feedback sensed by touch via one or more haptic feedback devices 432. Other output devices can also be used. The display 428 can be the same as or similar to the display assembly 122, discussed above with respect to FIG. 1. The processor 402 can be configured to control the output device adapter 416 to provide information to a user via the output devices connected to the output device adapter 416. In some examples, the output device adapter 416 can be connected to the input device 102, and can be configured to provide the computing system 104 with the ability to output information to a user through the input device 102. For example, haptic feedback can be provided from the computing system 104 to the input device 102 through the trackpad actuator 308 of the input device 102 in response to an input received by the computing system 104 from the input device 102.

Figure 5:
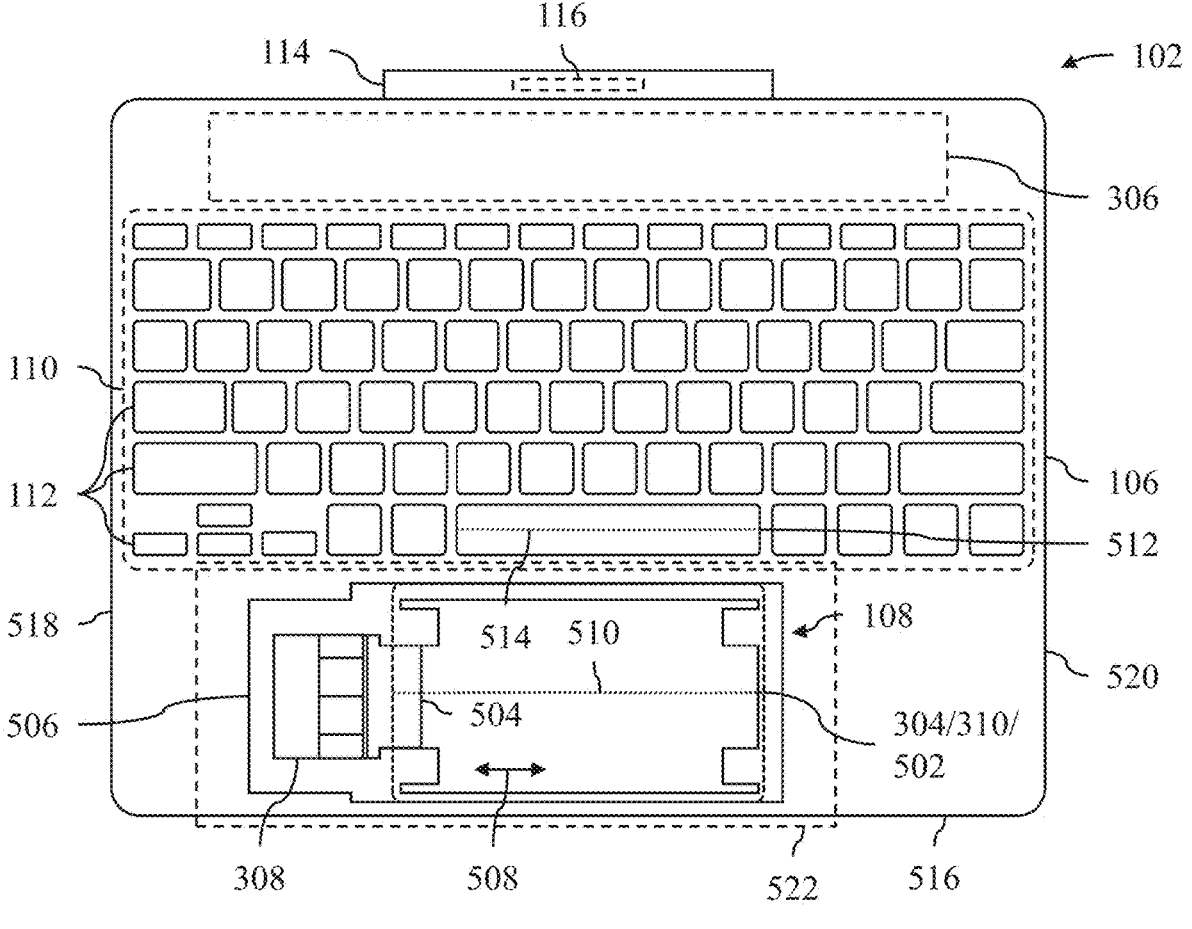
FIG. 5 shows a bottom view of an input device.

FIG. 5 illustrates a bottom-up view of an example implementation of the input device 102 with a back case/back wall of the housing 106 removed. FIG. 5 illustrates a layout of various components of the input device 102. As illustrated in FIG. 5, the input device 102 can include an interface portion 114, a capacitor bank 306, a keyboard portion 110 including a plurality of keys 112, and a trackpad 108. The interface portion 114 can be at one end (e.g., a device connection end) of the input device 102, and the trackpad 108 can be opposite the interface portion 114 (e.g., at a user-adjacent end). The capacitor bank 306 can be between the interface portion 114 and the keyboard portion 110. The keyboard portion 110 can be between the capacitor bank 306 and the trackpad 108.

The trackpad 108 can include a touch assembly 502 (also referred to as a trackpad assembly or a touch stack), which includes a logic board 304 and trackpad sensors 310. The logic board 304 and the trackpad sensors 310 can have the same or similar footprints (e.g., peripheries of the logic board 304 and the trackpad sensors 310 can be the same or aligned). An attraction plate 504 of the trackpad 108 can be attached to the touch assembly 502. The attraction plate 504 can be rigidly fixed to the touch assembly 502. The trackpad 108 can further include a beam plate 506 and an actuator 308. The actuator 308 can be attached to the beam plate 506, and the beam plate 506 can be attached to the housing 106 of the input device 102. The actuator 308 can be rigidly fixed to the beam plate 506 and the beam plate 506 can be rigidly fixed to the housing 106. The touch assembly 502 and the attraction plate 504 can be mounted on the beam plate 506 such that relative motion between the touch assembly 502 and the beam plate 506 can be actuated by the actuator 308.

The actuator 308 can be a magnetic actuator. The actuator 308 can be actuated to apply a magnetic field to the attraction plate 504 and attract or repel the attraction plate toward or away from the actuator 308. The actuator 308 can be actuated to move, pulse, or vibrate the attraction plate 504 (and the touch assembly 502 attached to the attraction plate 504) along a movement axis 508 (e.g., in a particular direction on the movement axis 508 toward or away from the actuator 308). The movement axis 508 can be parallel to a longitudinal axis 510 of the touch assembly 502, parallel to a longitudinal axis 514 of a spacebar 512 of the keys 112, and parallel to an edge 516 of the housing 106 proximal the trackpad 108. This movement can supply haptic feedback to the touch assembly 502, wherein a user, e.g., their fingertip, can feel the movement of the trackpad 108 in response to the operation of the actuator 308.

The logic board 304 (see FIGS. 6 and 7) can be connected to an electrical interface 116 of the interface portion 114, and can transfer data to and from the electrical interface 116. The logic board 304 can be connected to sensors of the keys 112 and to the trackpad sensors 310, and can supply input data to an external device (e.g., the computing system 104) based on input signals received from the sensors of the keys 112 and the trackpad sensors 310. The logic board 304 can be connected to the actuator 308, and can supply commands to the actuator 308 based on the input signals received from the trackpad sensors 310. In some examples, the logic board 304 can further supply commands to the actuator 308 based on data received through the electrical interface 116, such as from the external device/computing device 104. In some embodiments, commands to the actuator 308 can be sent to the input device 102 via a wireless interface (e.g., BLU-ETOOTH, Wi-Fi, or similar).

The capacitor bank 306 can be connected to the electrical interface 116 of the interface portion 114. More specifically, capacitors of the capacitor bank 306 can be connected to the electrical interface 116, and can be charged by the electrical interface 116. The capacitor bank 306 can be connected to the actuator 308. The actuator 308 can be powered by the capacitor bank 306. The capacitor bank 306 can supply power to the actuator 308 at a rate greater than a power supply through the electrical interface 116 and can support greater actuation forces for the actuator 308 than can be supplied by the electrical interface 116. A number of capacitors included in the capacitor bank 306 can be determined based on actuation forces that are desired to be provided by the actuator 308. For example, a greater number of capacitors can be included in the capacitor bank 306 to provide for greater actuation forces (and greater haptic feedback forces) to be supplied by the actuator 308.

The actuator 308 can be positioned between the keyboard portion 110 and the first edge 516 of the housing 106 proximal the trackpad 108. The actuator 308 can be between the touch assembly 502 and a second edge 518 of the housing 106 adjacent to, contiguous with, and angled (e.g., perpendicular) to the first edge 516. In some examples, the trackpad 108 can be flipped such that the actuator 308 is between the touch assembly 502 and a third edge 520 of the housing 106 adjacent to, contiguous with, and angled (e.g., perpendicular) to the first edge 516 and opposite the second edge 520. Each of the first edge 516, the second edge 518, and the third edge 520 can be sidewalls of the housing 106. By positioning the actuator 308 adjacent to and outside of the touch assembly 502, the trackpad 108 can be formed with a reduced thickness. This can be used to reduce an overall thickness of the input device 102. The actuator 308 can be positioned in a palm rest area of the input device 102. For example, a user can rest their palm on the housing 106 of the input device 102 in a first palm rest area between the keyboard portion 110 and the first edge 516 and between the trackpad 108 and the second edge 518 or in a second palm rest area between the keyboard portion 110 and the first edge 516 and between the trackpad 108 and the third edge 520 when the user uses the keys 112 of the input device 102.

Figure 6:
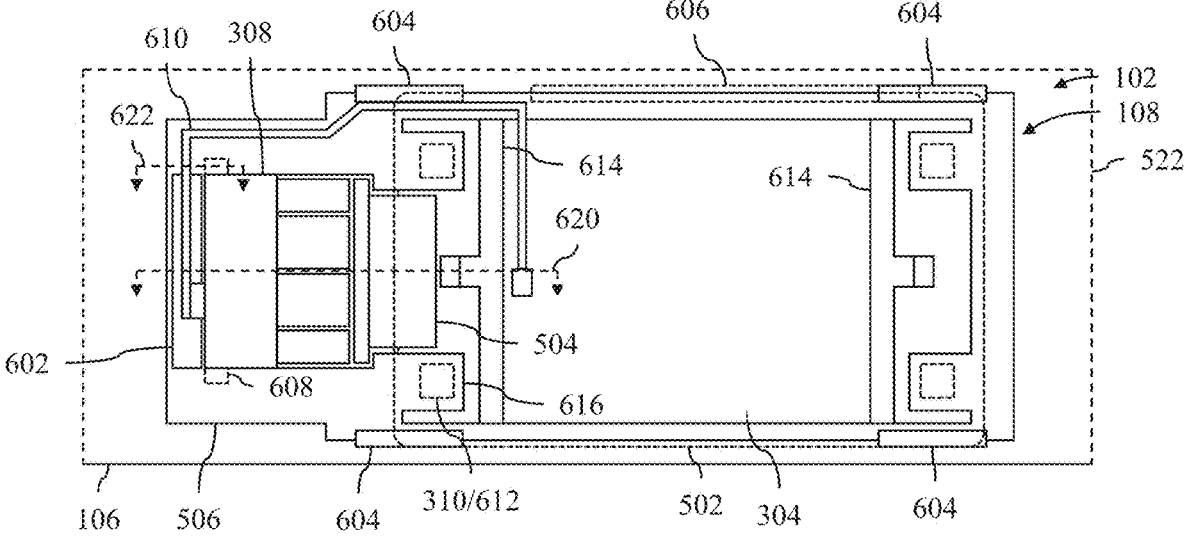
FIG. 6 shows a bottom view of a portion of an input device including a trackpad, as indicated by region 522 shown in FIG. 5.

FIG. 6 shows a zoomed in, bottom-up view of a region 522 of FIG. 5. FIG. 6 illustrates a layout and mounting of various components of the trackpad 108 and the input device 102. For example, FIG. 6 illustrates some portions of adhesive foam layers 602 that can be used to attach a beam plate 506 of the trackpad 108 to a top case and/or a bottom case of a housing 106 of the input device 102 and adhesives 604, 606 that can be used to attach the beam plate 506 to the top case or the bottom case of the housing 106. FIG. 6 further illustrates connections to the logic board 304. This includes connections between an actuator 308 and the logic board 304 through wires 610 and connections between trackpad sensors 310 and the logic board 304 through connectors 614.

The adhesive foam layers 602 can be used to attach the beam plate 506 to a top case and/or a bottom case of the housing 106 of the input device 102. The adhesive foam layers 602 can include pressure-sensitive adhesives, glues, flexible polymers/resins, compressible silicone layers, similar materials, or combinations thereof. In some examples, the adhesive foam layers 602 can comprise foams (e.g., foam layers with adhesive outer layers/surfaces), tapes (e.g., with compliant layers and adhesive surfaces), or rubberized/elasticized glues or putties, thereby affording compliant movement of the parts the adhesive foam layers 602 attach to relative to each other. The adhesive foam layers 602 can provide a semi-rigid attachment between the beam plate 506 and the housing 106. The adhesive foam layers 602 can be used to maintain tolerances within the trackpad 108, such as between the actuator 308 and an attraction plate 504, while accommodating some movement and bending of the housing 106. This allows the tolerances between the actuator 308 and the attraction plate 504 to be maintained, even as the input device 102 is used in different positions (such as while sitting on a desk, while sitting on a user's lap, being held by the corner, or the like), experiences bending, minor amounts of compression, and the like. The adhesive foam layers 602 can be attached to opposite sides of the beam plate 506. For example, the adhesive foam layers 602 can be attached between the beam plate 506 and the top case and between the beam plate 506 and the bottom case. The adhesive foam layers 602 can be attached to the top case and/or the bottom case of the housing 106. A gap can be provided between one of the adhesive foam layers 602 and the top case or the bottom case of the housing 106. The adhesive foam layers 602 can prevent vibrating and collisions between the beam plate 506 and the housing 106 and can prevent unwanted noise caused by components of the input device 102 contacting one another.

Adhesives 604, 606 can further be used to attach the beam plate 506 to the top case or the bottom case of the housing 106. The adhesives 604, 606 can include pressure-sensitive adhesives, glues, flexible polymers/resins, compressible silicone layers, similar materials, or combinations thereof. In some examples, the adhesives 604, 606 can comprise foams (e.g., foam layers with adhesive outer layers/surfaces), tapes (e.g., with compliant layers and adhesive surfaces), or rubberized/elasticized glues or putties, thereby affording compliant movement of the parts the adhesives 604, 606 attach to relative to each other. The adhesives 604, 606 can be selectively placed between the beam plate 506 and the top case or the bottom case of the housing 106. For example, as illustrated in FIG. 6, adhesives 604 can be placed in four positions along portions of the beam plate 506 proximal to longitudinal edges of a touch assembly 502 of the trackpad 108. The adhesives 604 can be placed in two positions along portions of the beam plate 506 proximal each longitudinal edge of the touch assembly 502. In some examples, the two adhesives 604 placed in two positions along portions of the beam plate 506 proximal one longitudinal edge of the touch assembly 502 can be replaced by a single relatively longer adhesive 604 placed in a position along a portion of the beam plate 506 proximal the longitudinal edge of the touch assembly 502. This can be done to replace the adhesives 604 on the opposite side of the beam plate 506 as well. The adhesives 604, 606 can further attach the beam plate 506 to the top case or the bottom case of the housing 106 and prevent any unwanted movement or vibrations between the beam plate 506 and the top case or the bottom case of the housing 106.

The actuator 308 can include mounting tabs 608 that are attached to the beam plate 506. The actuator 308 can be rigidly fixed to the beam plate 506 adjacent to the adhesive foam layers 602. The mounting tabs 608 of the actuator 308 can be attached to the beam plate 506 by screws, adhesives, welding, or the like. The actuator 308 can be a relatively heavy component of the touch pad 108, and can be prone to movement and displacement from its intended rest position due to the actuation action of the actuator 308. By providing the adhesive foam layers 602 adjacent to the actuator 308, any undesired movement of the actuator 308 and/or the beam plate 506 can be avoided.

FIG. 6 further illustrates connections between the components of the trackpad 108. The actuator 308 can be connected (e.g., electrically connected) to the logic board 304 by wires 610. The wires 610 can extend through one of the adhesive foam layers 602, with the adhesive foam layer 602 at least partially surrounding the wires 610. The wires 610 can provide a flexible connection between the actuator 308 and the logic board 304, which allows for relative movement between the actuator 308 and the logic board 304. For example, the wires 610 can allow the logic board 304 to move relative to the actuator 308 when the actuator 308 is actuated to supply haptic feedback.

The trackpad sensors 310 can include strain gauges 612 that are between the beam plate 506 and the logic board 304. See also FIG. 9A. The strain gauges 612 can detect forces between the logic board 304 and the beam plate 506, such as forces resulting from user input to the trackpad 108. The strain gauges 612 can be connected (e.g., physically and electrically connected) to the logic board 304 through connectors 614. The connectors 614 can be electrical flexes, substrates, or the like. The connectors 614 can provide a flexible connection or a rigid connection between the strain gauges 612 and the logic board 304. For example, the connectors 614 can provide a flexible connection between the strain gauges 612 and the logic board 304, which allows for relative movement between the strain gauges 612 and the logic board 304 when the actuator 308 is actuated to supply haptic feedback. In some examples, the connectors 614 can provide a rigid connection between the strain gauges 612 and the logic board 304, such that the strain gauges 612 move with the logic board 304 when the actuator 308 is actuated to supply haptic feedback. The beam plate 506 can include mounting tabs 616 (also visible in FIGS. 9A-9B) onto which the strain gauges 612 are positioned.

As illustrated in FIG. 6, the actuator 308 can be disposed outside of a periphery of the touch assembly 502 in a view perpendicular to a touch surface of the touch assembly 502. The attraction plate 504 can be attached to the touch assembly 502 within the periphery of the touch assembly 502 and can extend outside of the periphery of the touch assembly 502. At least a portion of the beam plate 506 can extend under the periphery of the touch assembly 502.

Figure 7:
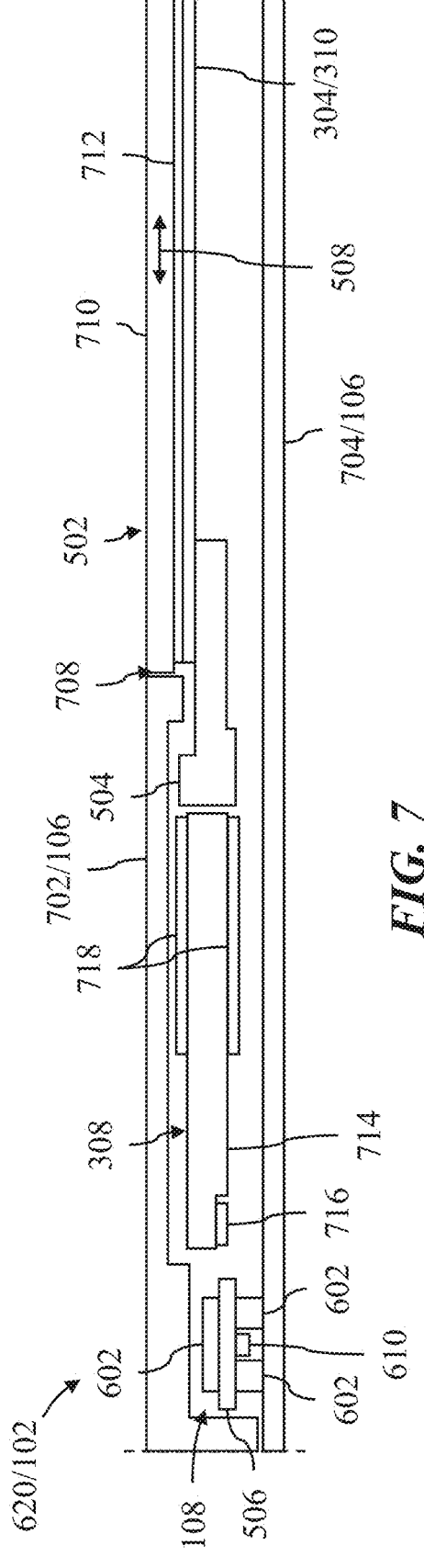
FIG. 7 shows a cross-sectional view of a portion of an input device as taken through section line 620 in FIG. 6.

FIG. 7 shows a cross-sectional view of an input device 102 along a cross-section line 620 of FIG. 6. Specifically, FIG. 7 illustrates an arrangement of components of a trackpad 108 in a housing 106 of the input device 102. The housing 106 can include a top case 702 and a bottom case 704 opposite the top case 702. The top case 702 of the housing 106 can be a top portion or wall of the input device 102 that defines a top surface of the input device 102. The top surface defined by the top case 702 can include a touch surface 710 of the trackpad 108 and keys of the input device 102. The bottom case 704 can be a back or bottom portion or wall of the housing 106. The bottom case 704 can define a back or bottom surface of the input device 102, which can be a surface on which the input device 102 is configured to sit. The trackpad 108 can be between the top case 702 and the bottom case 704. A touch assembly 502 of the trackpad 108 can extend at least partially through an opening 708 in the top case 702. A beam plate 506 can be attached to the top case 702 and/or the bottom case 704 by adhesive foam layers 602. An actuator 308 can be attached to the beam plate 506, and an attraction plate 504 can be attached to the touch assembly 502.

The touch assembly 502 can include a touch surface 710 on a cover panel, an adhesive layer 712, and a logic board 304. The logic board 304 can include various sensors, and can also act as touchpad sensors 310. For example, the logic board 304 can include touch sensors (e.g., capacitive touch sensors, parallel and/or overlapping conductive traces, etc.), accelerometers, force sensors, and the like. The touchpad sensors 310 can detect contact of a user's finger or other objects with the touch surface 710, and the logic board 304 can determine user inputs to the trackpad 108 based on the detections of the touchpad sensors 310. The touch surface 710 can be positioned on a cover panel formed of a glass material, polymers, metals, composites, or the like, and the cover panel can be referred to as a cover glass or interface plate. In some examples, the cover panel can include an aluminosilicate material. The cover panel can be attached to the logic board 304 by the adhesive layer 712, which can include a pressure-sensitive adhesive or the like.

The attraction plate 504 can be attached to the touch assembly 502. Specifically, the attraction plate 504 can be rigidly fixed to the touch assembly 502. The attraction plate 504 can be attached to the touch assembly 502 by welding, adhesives, or the like. When the actuator 308 is actuated, the actuator 308 can generate a magnetic field, which can attract or repel the attraction plate 504. This can move the touch assembly 502 toward or away from the actuator 308, supplying haptic feedback to the touch assembly 502. The actuator 308 can apply the magnetic field, and the attraction plate 504 and the touch assembly 502 can move along a movement axis 508 parallel to a longitudinal axis of the touch surface 710. The opening 708 can be sized to accommodate the touch assembly 502 with a gap around the touch assembly 502 that allows for movement of the touch assembly 502 along the movement axis 508 when the actuator 308 is actuated. By positioning the actuator 308 to the side of the touch assembly 502, outside of a periphery of the touch assembly 502, a thickness of the input device 102 can be reduced. Moreover, as will be discussed in detail below, dimensions of the actuator 308 can be optimized in order to reduce a thickness of the actuator 308, further reducing the thickness of the input device 102.

The actuator 308 can include a body portion 714, a connector 716, and coils 718. The body portion 714 can include mounting tabs used to attach the actuator 308 to the beam plate 506, a back iron portion, and a core portion, which can include one or more tines. See also FIGS. 10A-10C. The connector 716 can provide connections between wires 610 connected to the logic board 304 and components of the actuator 308. For example, the connector 716 can connect the coils 718 to the wires 610, and can be used to power the coils 718 when the actuator 308 is actuated. The coils 718 can include wires that are wrapped around the tines of the body portion 714. When the coils 718 are powered, a magnetic field is produced by the coils 718 and the core portion of the body portion 714 via electromagnetic effects. This magnetic field can be applied to the attraction plate 504 to attract or repel the attraction plate 504 and the touch assembly 502. This causes the attraction plate 504 to move toward or away from the actuator 308, and can be used to supply haptic feedback to the touch assembly 502.

As illustrated in FIG. 7, an adhesive foam layer 602 can be attached to a top surface of the beam plate 506. The adhesive foam layer 602 on the top surface of the beam plate 506 can be separated from the top case 702 by a gap, or can be attached to a bottom surface of the top case 702. An adhesive foam layer 602 can be attached to a bottom surface of the beam plate 506 and a top surface of the bottom case 704. The adhesive foam layers 602 can provide a semi-rigid attachment between the beam plate 506 and the housing 106. The adhesive foam layers 602 can be used to maintain tolerances within the trackpad 108, such as between the actuator 308 and the attraction plate 504, while accommodating some movement and bending of the housing 106. This allows the tolerances between the actuator 308 and the attraction plate 504 to be maintained, even as the input device 102 is used in different positions, experiences bending, and the like. Providing a gap between the adhesive foam layers 602 and either the top case 702 or the bottom case 704 can allow for increased amounts of movement between components of the input device 102. The adhesive foam layers 602 can be attached to the beam plate 506 adjacent to the actuator 308, and can prevent relative movement of components of the input device 102 caused by actuation of the actuator 308. The adhesive foam layers 602 can prevent vibrating and collisions between the beam plate 506 and the housing 106, and can prevent unwanted noise caused by components of the input device 102 contacting one another.

The wires 610 can extend through and be at least partially surrounded by one of the adhesive foam layers 602, and can be connected to the connector 716 of the actuator 308 and the logic board 304. The wires 610 can be flexible, and can allow for relative movement of the actuator 308 and the touch assembly 502. The wires 610 can be attached to the beam plate 506.

Figure 8:
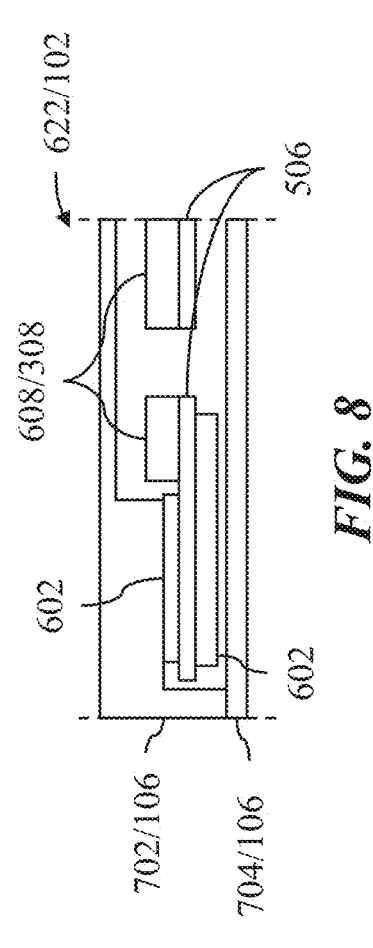
FIG. 8 shows a cross-sectional view of a portion of an input device as taken through section line 622 in FIG. 6.

FIG. 8 shows a cross-sectional view of an input device 102 along a cross-section line 622 of FIG. 6. Specifically, FIG. 8 shows an arrangement of a beam plate 506 and an actuator 308 within a housing 106 of the input device 102. As illustrated in FIG. 8, an adhesive foam layer 602 can be attached to a top surface of the beam plate 506 and a bottom surface of a top case 702 of the housing 106. An adhesive foam layer 602 can be attached to a bottom surface of the beam plate 506. The adhesive foam layer 602 on the bottom surface of the beam plate 506 can be separated from a bottom case 704 of the housing 106 by a gap, or can be attached to a top surface of the bottom case 704. Mounting tabs 608 of the actuator 308 can be attached to the top surface of the beam plate 506. The mounting tabs 608 can be attached to the beam plate 506 by adhesives, screws, welding, or other fastening means. As illustrated in FIG. 8, the mounting tabs 608 and the beam plate 506 can include openings in which a screw or other fastener can be mounted; however, the openings can be omitted and the mounting tabs 608 and the beam plate 506 can include continuous materials in the cross-section of FIG. 8.

The adhesive foam layers 602 can provide a semi-rigid attachment between the beam plate 506 and the housing 106. The adhesive foam layers 602 can be used to maintain tolerances within the trackpad, such as between the actuator 308 and an attraction plate, while accommodating some movement and bending of the housing 106. This allows the tolerances between the actuator 308 and the attraction plate to be maintained, even as the input device 102 is used in different positions, experiences bending, and the like. Providing a gap between the adhesive foam layers 602 and either the top case 702 or the bottom case 704 can allow for increased amounts of movement between components of the input device 102. The adhesive foam layers 602 can be attached to the beam plate 506 adjacent to the actuator 308, and can prevent relative movement of components of the input device 102 caused by actuation of the actuator 308. The adhesive foam layers 602 can prevent vibrating and collisions between the beam plate 506 and the housing 106, and can prevent unwanted noise caused by components of the input device 102 contacting one another.

Figure 9A:
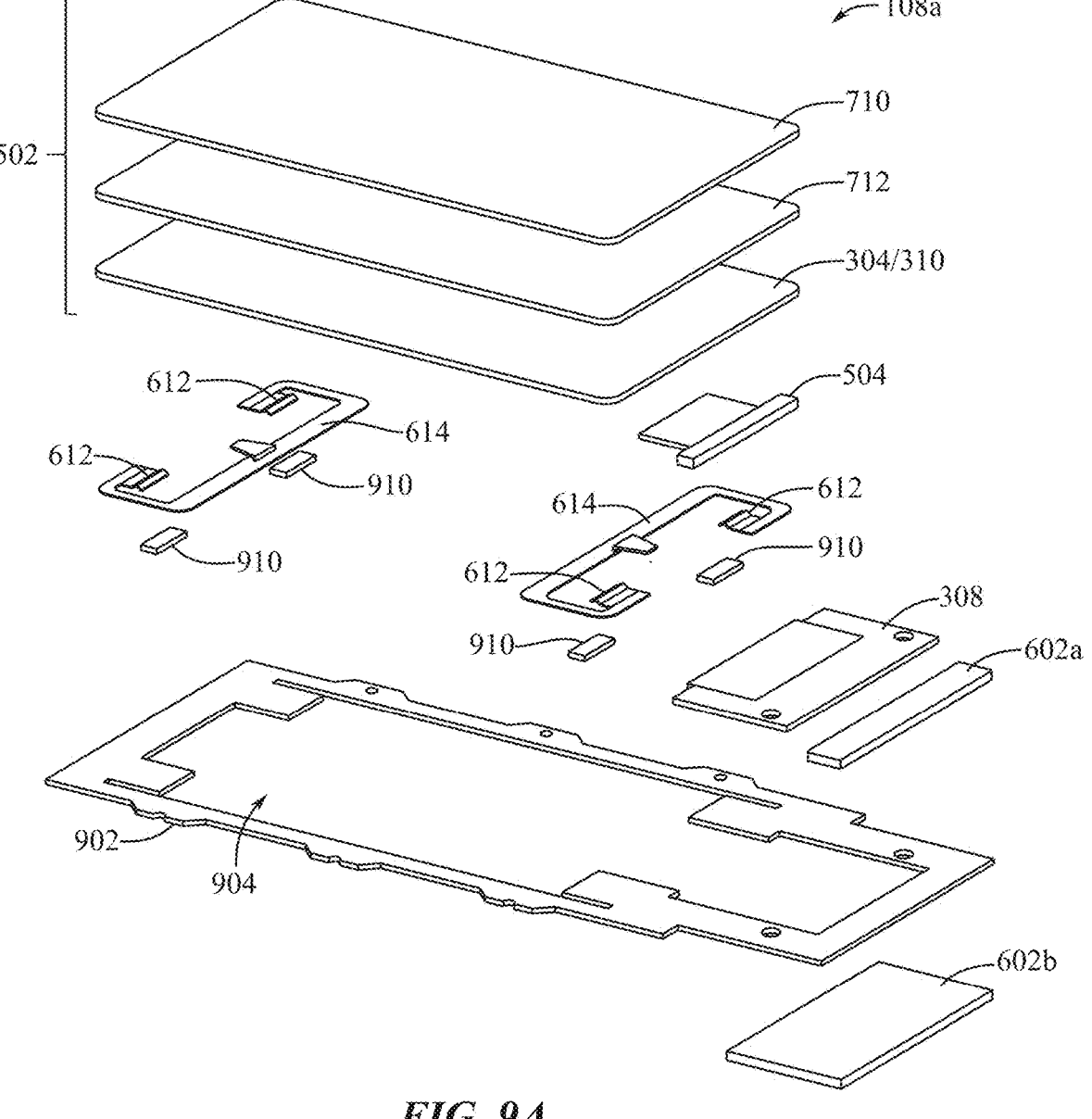
FIGS. 9A and 9B show perspective exploded views of two different embodiments of trackpads.
Figure 9B:
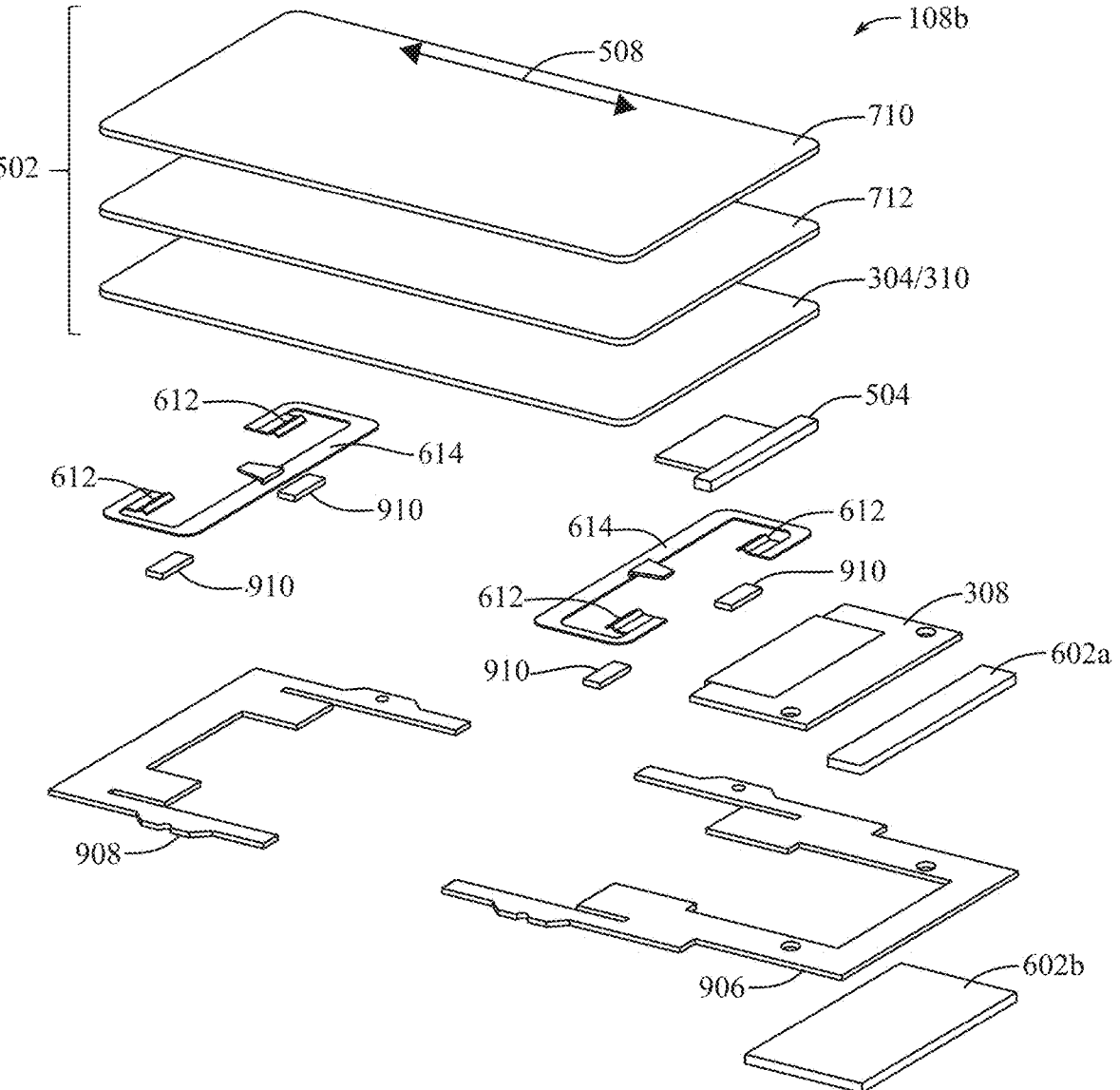

FIGS. 9A and 9B illustrate exploded views of a trackpad 108a and a trackpad 108b, respectively, according to alternative embodiments of the present disclosure. FIG. 9A illustrates the trackpad 108a with a one-piece beam plate 902. In the example of FIG. 9A, the beam plate 902 has a generally rectangular shape, with a generally rectangular opening 904 that can be disposed below a touch assembly 502. The entire beam plate 902 can be attached to a housing of an input device (e.g., to a top case and/or a bottom case of the housing), which can simplify construction of the input device.

FIG. 9B illustrates a trackpad 108b with a two-piece beam plate, including a first beam plate 906 and a second beam plate 908. Each of the beam plates 906, 908 can be U- or C-shaped with open ends that face toward each other and that surround the trackpad 108b except along certain gap portions of the longitudinal edges of the trackpad 108b. The beam plates 906, 908 can have a similar shape to the beam plate 902, with a central portion of the beam plate 902 being removed to form the two beam plates 906, 908. Each of the beam plates 906, 908 can be independently secured to a housing of an input device (e.g., to a top case and/or a bottom case of the housing). This can reduce contact, noise, and vibrations between the beam plates 906, 908 and the housing of the input device.

Adhesive foam layers 602a, 602b can be attached to the beam plates 902, 906. As discussed previously, the adhesive foam layers 602a, 602b can be used to attach the beam plates 902, 906 to a top case and/or a bottom case of a housing of an input device in a semi-rigid manner. This can allow for some movement of the beam plates 902, 906 relative to the housing (e.g., as the housing bends or moves), while maintaining a gap between an actuator 308 and an attraction plate 504. The adhesive foam layers 602a, 602b can further prevent the beam plates 902, 906 and the actuator 308 from contacting the housing or other components of the input device, preventing undesired noise and damage to the input device. The adhesive foam layer 602a can be attached to a top surface of the beam plates 902, 906 and the adhesive foam layer 602b can be attached to a bottom surface of the beam plates 902, 906. The adhesive foam layer 602b can have a relatively smaller width than the adhesive foam layer 602a; however, any suitable dimensions can be used for the adhesive foam layers 602a, 602b. The adhesive foam layer 602b can include an opening that can be configured to at least partially surround wires connected between the actuator 308 and a logic board 304.

The actuator 308 can be attached to the top surface of the beam plates 902, 906. The actuator 308 can be rigidly fixed to the beam plates 902, 906 using screws, welding, adhesives, or other suitable fasteners. The actuator 308 can be attached to the beam plates 902, 906 adjacent to the adhesive foam layer 602a. The actuator 308 can be a relatively heavy component of the trackpads 108a, 108b, and can generate movement forces as the actuator 308 is actuated. By providing the adhesive foam layer 602a for securing the beam plates 902, 906 to the housing adjacent to the actuator 308, the actuator 308 can be secured even as the actuator 308 is actuated. This prevents the actuator 308 and the beam plates 902, 906 from contacting other components of the input device, even when the actuator 308 is actuated.

The touch assembly 502 can include a touch surface 710 on a cover panel, an adhesive layer 712, and a logic board 304. The logic board 304 can include various sensors, and can also act as touchpad sensors 310. For example, the logic board 304 can include touch sensors (e.g., capacitive touch sensors), accelerometers, force sensors, and the like. The touchpad sensors 310 can detect contact with a user's finger or other objects with the touch surface 710, and the logic board 304 can determine user inputs to the trackpads 108a, 108b based on the detections of the touchpad sensors 310. The cover panel can be attached to the logic board 304 by the adhesive layer 712, which can include a pressure-sensitive adhesive or the like. As illustrated in FIGS. 9A and 9B, the touch surface 710, the adhesive layer 712, and the logic board 304 can have the same dimensions or footprint. The touch assembly 502 can be sized to fit in an opening in a top case of a housing of an input device.

The attraction plate 504 can be attached to the touch assembly 502. Specifically, the attraction plate 504 can be rigidly fixed to the logic board 304 of the touch assembly 502. The attraction plate 504 can be attached to the touch assembly 502 by welding, adhesives, or the like. When the actuator 308 is actuated, the actuator 308 can generate a magnetic field, which can attract or repel the attraction plate 504. This can move the touch assembly 502 towards or away from the actuator 308, supplying haptic feedback to the touch assembly 502. The actuator 308 can apply the magnetic field and the attraction plate 504 and the touch assembly 502 can move in a movement axis 508 parallel to a longitudinal axis of the touch assembly 502 and the touch surface 710. The touch assembly 502 can be sized relative to an opening in a top case of a housing of an input device such that a gap is positioned around the touch assembly 502. This allows for movement of the touch assembly 502 along the movement axis 508 when the actuator 308 is actuated to supply haptic feedback to the touch assembly 502. In some embodiments, the actuator 308 attracts the attraction plate 504 due to the attraction plate 504 comprising a ferromagnetic material that is not magnetized when the actuator 308 is not generating a magnetic field. Thus, the attraction plate 504 is not repelled by a magnetic field of the actuator 308 when activated and is instead attracted by the magnetic field irrespective of the polarity of the magnetic field. In other cases, the attraction plate 504 can comprise a magnetic material that is attracted or repelled from the actuator 308 depending on the polarity of the field generated by the actuator 308.

Pads 910 can be mounted on the beam plates 902, 906, 908. The pads 910 can allow for minor shear movement of a touch assembly 502 relative to the beam plates 902, 906, 908. For example, when the actuator 308 is actuated to attract or repel the attraction plate 504, the pads 910 allow for shear movement of the touch assembly 502 along the movement axis 508 parallel to a longitudinal axis of the touch assembly 502. The pads 910 can be formed from a gel material, such as a silicone material or the like, a compliant foam material, or the like.

Strain gauges 612 can be positioned between the touch assembly 502 and the beam plates 902, 906, 908. The strain gauges 612 can be used to detect forces applied to the touch assembly 502, such as through user inputs to the touch assembly 502. The strain gauges 612 can be part of touchpad sensors 310 of the trackpads 108a, 108b. The strain gauges 612 can be physically and electrically connected to the logic board 304 through connectors 614, which may be electrical flexes.

Figure 10A:
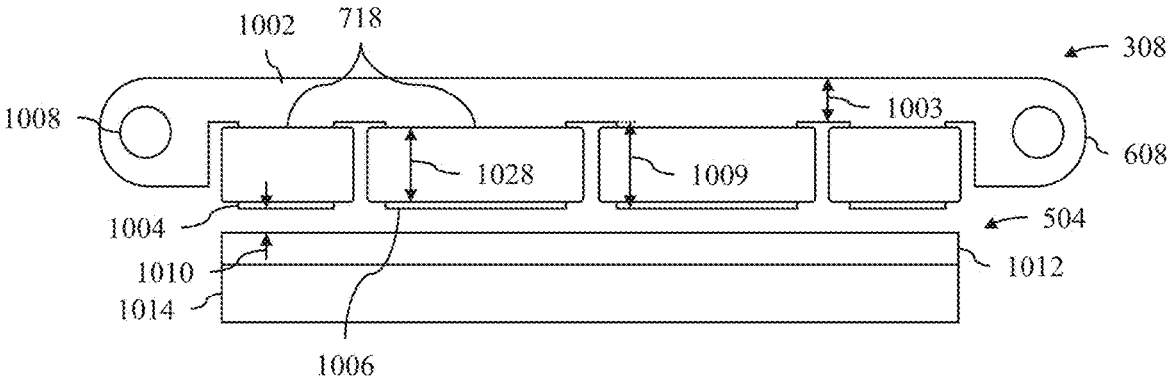
FIG. 10A shows a top view of an actuator and an attraction plate.
Figure 10B:
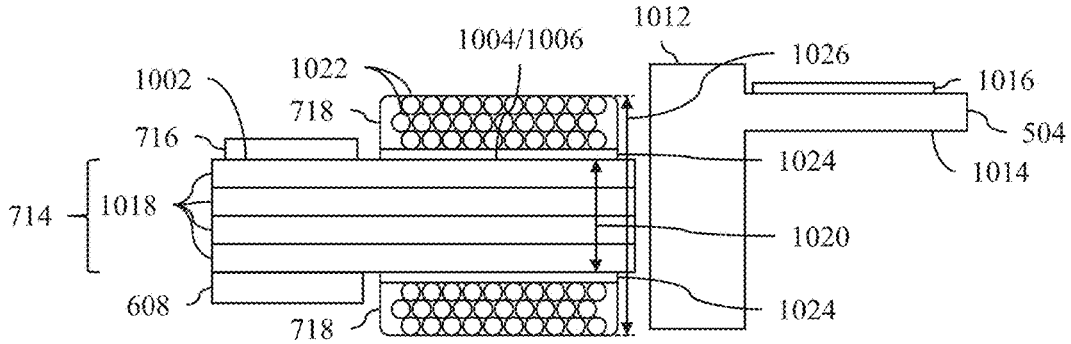
FIG. 10B shows a side cross-sectional view of an actuator and an attraction plate.
Figure 10C:
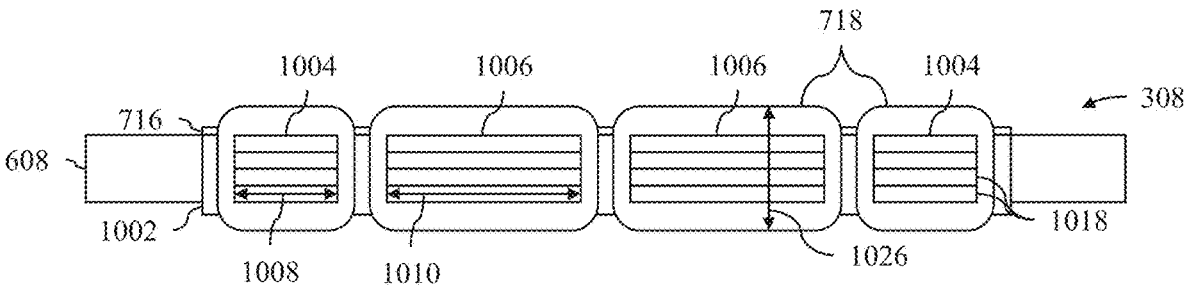
FIG. 10C shows a front view of an actuator.

FIGS. 10A through 10C show various views of an actuator 308 and an attraction plate 504 that can be used in connection with the other figures and embodiments disclosed herein. Specifically, FIG. 10A shows a top-down view of the actuator 308 and the attraction plate 504. FIG. 10B shows a cross-sectional view of the actuator 308 and the attraction plate 504. FIG. 10C shows a front-to-back view of the actuator 308. FIGS. 10A through 10C illustrate specific configurations and dimensions of the actuator 308 and the attraction plate 504.

The actuator 308 can be a reluctance actuator. The actuator 308 can include a back iron 1002, mounting tabs 608 on either side of the back iron 1002, narrow tines 1004 and wide tines 1006 extending from the back iron 1002, and coils 718 wrapping around the tines 1004, 1006. The actuator 308 can further include a connector 716, which can be connected to a logic board of an input device and can be used to supply electricity to the coils 718 to actuate the actuator 308. The connector 716 can be attached to a surface of the back iron 1002 by an adhesive, welding, or the like. The tines 1004, 1006 act as a core of the actuator 308, and the tines 1004, 1006 and the coils 718 create a magnetic field when electricity is supplied through the connector 716 to the coils 718. The back iron 1002 can be formed from the material of the tines 1004, 1006, and can form a return path for flux between the tines 1004, 1006. The back iron 1002 can have a depth 1003 in a range from about 5 mm to about 12 mm. The mounting tabs 608 can be used to mount the actuator 308 to a beam plate of an input device, and can be attached to the beam plate by welding, adhesives, screws through openings, or the like.

The narrow tines 1004 can be outer tines of the actuator 308, and the wide tines 1006 can be inner tines of the actuator 308. Any number of tines 1004, 1006 can be included in the actuator 308, such as, for example, three to five tines, with an outer tine on each side being a narrow tine

1004 and inner tines being wide tines 1006. The narrow tines 1004 can have widths 1008 in a range from about 5 mm to about 7 mm, from about 6 mm to about 7 mm, or the like. The wide tines 1006 can have widths in a range from about 11 mm to about 13 mm, from about 12 mm to about 13 mm, or the like. Providing the tines 1004, 1006 with greater widths can increase the magnetic field generated by the actuator 308, but can also increase the overall width of the actuator 308. The tines 1004, 1006 can have lengths 1009 in a range from about 9 mm to about 14 mm, from about 8 mm to about 13 mm, or the like. Increasing the length 1009 of the tines 1004, 1006 can increase the magnetic field that can be generated by the actuator 308, but can also enlarge a length of the actuator 308.

The attraction plate 504 can include an attraction portion 1012 and an attachment portion 1014. The attraction plate 504 can be formed from a magnetic metal material, such as stainless steel or the like. The attraction portion 1012 can have dimensions (e.g., a height and width) similar to overall dimensions of the tines 1004, 1006 and the coils 718 of the actuator 308. The attraction portion 1012 can be attracted to or repelled by the magnetic field generated by the actuator 308 to move the attraction plate 504 relative to the actuator 308. The attachment portion 1014 can be used to attach the attraction plate 504 to a touch assembly of an input device. The attachment portion 1014 can be attached to the touch assembly by a rigid attachment mechanism, such as an adhesive 1016, welding, screws, or the like. The attraction plate 504 can be separated from the actuator 308 by a gap 1010. The gap 1010 can have a size ranging from about 0.225 mm to about 0.375 mm, from about 0.250 mm to about 0.350 mm, or the like. Reducing the size of the gap 1010 between the attraction plate 504 and the actuator 308 can increase the flux of the magnetic field of the actuator 308 that is applied to the attraction plate 504. However, if the gap is too small, this can result in the attraction plate 504 striking the actuator 308. Further, reducing the gap 1010 can reduce tolerances in the input device. As described previously, components of the input device can be semi-rigidly attached together in order to maintain the gap 1010, even as the housing of the input device moves or bends as it is used. Thus, the gap 1010 can be configured with a size sufficient to prevent contact between the attraction portion 1012 and the actuator 308 while still minimizing its size for haptic generation efficiency.

The tines 1004, 1006 and the back iron 1002 of the actuator 308 can be formed from the same or different materials. As illustrated in FIGS. 10B and 10C, both the tines 1004, 1006 and the back iron 1002, or the tines 1004, 1006 alone can include laminated layers 1018 of materials. The tines 1004, 1006 and the back iron 1002 of the actuator 308 can be formed from materials having a high magnetic permeability, which increases a magnetic field that can be generated by the actuator 308. In the example illustrated in FIGS. 10B and 10C, the tines 1004, 1006 and the back iron 1002 can be formed from four layers 1018 of a laminated material. A number of the layers 1018 included in the tines 1004, 1006 and the back iron 1002 can be in a range from one to five layers, or from two to four layers. Forming the tines 1004, 1006 and the back iron 1002 with fewer laminated layers 1018 decreases the thickness of the actuator 308, but reduces the force that can be applied by the actuator 308 (e.g., the magnetic field produced by the actuator 308). The layers 1018 of the laminated material can be separated from one another by a gap, such as a gap in a range from about 25 μm to about 30 μm, from about 26 μm to about 29 μm, or the like. The tines 1004, 1006 and the back iron 1002 can be formed from electrical sheet steel, which can include oriented or non-oriented grains. The tines 1004, 1006 and the back iron 1002 can be formed from silicon steel, iron cobalt alloys, or the like. The tines 1004, 1006 and the back iron 1002 can have a thickness 1020 in a range from about 0.5 mm to about 2.2 mm, from about 1.2 mm to about 2.2 mm, from about 1.2 mm to about 1.8 mm, or the like. Each of the layers 1018 can have a thickness in a range from about 0.3 mm to about 0.7 mm, from about 0.35 mm to about 0.65, or the like.

Each of the tines 1004, 1006 can be wrapped by the coils 718. The coils 718 can include wires 1022 wrapped around the tines 1004, 1006. The wires 1022 can be wrapped around the tines 1004, 1006 in a number of layers, such as one to four layers (with three layers being illustrated in FIG. 10B. The wires 1022 can be formed from a conductive material, such as copper, and can be coated or uncoated. The wires 1022 can have diameters in a range from about 0.1 mm to about 0.2 mm, from about 0.16 mm to about 0.18 mm, from about 0.15 mm to about 0.22 mm, or the like. Each of the coils 718 can include a number of turns of the wires 1022, such as from 16 to 268 turns, or from 38 to 120 turns. The coils 718 can be attached to the tines 1004, 1006 by adhesives 1024, which can have thicknesses in a range from about 0.08 mm to about 0.12 mm. An overall thickness 1026 of the actuator 308 between opposite surfaces of the coils 718 can be in a range from about 2 mm to about 3.7 mm, from about 2 mm to about 2.9 mm, from about 2 mm to about 2.6 mm, or the like. The coils 718 can have lengths 1028 in a range from about 4 mm to about 13 mm, from about 9 mm to about 14 mm, from about 8 mm to about 13 mm, from about 12 mm to about 14 mm, or the like.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An input device comprising:
a trackpad comprising a touch surface;
an actuator configured to supply haptic feedback to the trackpad, the actuator being disposed outside of a periphery of the touch surface in a view perpendicular to the touch surface, the actuator being disposed to a side of the touch surface in a direction parallel to a longitudinal axis of the touch surface;
a back wall opposite the touch surface; and
a beam plate between the trackpad and the back wall, the beam plate at least partially attached to the back wall by an adhesive material.

2. The input device of claim 1, wherein the actuator is configured to supply the haptic feedback to the trackpad by generating a magnetic field that attracts an attraction plate of the trackpad.

3. The input device of claim 2, wherein the attraction plate extends from within the periphery of the touch surface in the view perpendicular to the touch surface to outside of the periphery of the touch surface in the view perpendicular to the touch surface.

4. The input device of claim 2, wherein the attraction plate is rigidly fixed to a touch assembly of the trackpad, the touch assembly comprising the touch surface.

5. The input device of claim 1, further comprising:
a plurality of keys; and
a touch assembly, the touch assembly comprising the touch surface and a logic board disposed within the periphery of the touch surface in the view perpendicular to the touch surface, the logic board being connected to the plurality of keys and the actuator.

6. The input device of claim 1, further comprising a housing comprising the back wall, wherein:
the trackpad is positioned in an opening in a top wall of the housing; and
the actuator is attached to an inner surface of the top wall of the housing by an adhesive layer.

7. The input device of claim 1, wherein:
the actuator comprises an electromagnetic actuator comprising a coil surrounding a core; and
the core comprises three or fewer laminated layers of silicon steel.

8. A keyboard comprising:
a keyboard housing; and
a trackpad in the keyboard housing, the trackpad comprising:
a touch assembly disposed in an opening in a top case of the keyboard housing; and
an actuator attached to an inner surface of the top case of the keyboard housing by a first adhesive layer, the actuator configured to apply a force to the touch assembly to supply haptic feedback to the touch assembly.

9. The keyboard of claim 8, further comprising a second adhesive layer attached to the actuator opposite the first adhesive layer.

10. The keyboard of claim 9, wherein the second adhesive layer is separated from a back case of the keyboard housing by a gap.

11. The keyboard of claim 8, wherein:
the trackpad further comprises a beam plate between the touch assembly and a back case of the keyboard housing; and
the beam plate is at least partially attached to the back case of the keyboard housing by an adhesive material.

12. The keyboard of claim 8, wherein the trackpad further comprises a beam plate comprising:
a first C-shaped beam plate portion attached to the keyboard housing; and
a second C-shaped beam plate portion attached to the keyboard housing and separated from the first C-shaped beam plate portion.

13. The keyboard of claim 8, wherein:
the trackpad further comprises an attraction plate rigidly fixed to the touch assembly; and
the actuator is configured to apply a force to the attraction plate to supply the haptic feedback to the touch assembly.

14. The keyboard of claim 8, further comprising a spacebar, wherein the actuator is configured to apply a magnetic field to the touch assembly in a direction parallel to a longitudinal axis of the spacebar.

15. The keyboard of claim 8, wherein the keyboard housing comprises:
a key portion comprising a plurality of keys;
a first edge proximal the trackpad opposite the key portion;
a second edge angled to and contiguous with the first edge; and
a palm rest portion between the trackpad and the second edge and between the key portion and the first edge, wherein the actuator is attached to the keyboard housing in the palm rest portion of the keyboard housing.

16. The keyboard of claim 8, wherein the actuator is positioned outside a periphery of the touch assembly.

17. A keyboard comprising:
a trackpad;
a capacitor bank;
an electrical interface connected to the capacitor bank and operable to supply power to the capacitor bank at up to a first rate; and
an actuator connected to the capacitor bank, operable to provide haptic feedback to the trackpad, and configured to draw power from the capacitor bank at a second rate greater than the first rate.

18. The keyboard of claim 17, further comprising a plurality of keys, wherein:
the trackpad comprises a touch assembly;
the touch assembly comprises a logic board; and
the logic board comprises a single controller for both the actuator and the plurality of keys.

19. The keyboard of claim 17, further comprising a key area comprising a plurality of keys, the capacitor bank being disposed between the electrical interface and the key area.

20. The keyboard of claim 17, wherein:
the trackpad comprises a strain gauge to detect input provided to an input surface of the trackpad;
the keyboard is configured to output a signal to the electrical interface based on the input detected via the strain gauge; and
the actuator is configured to provide the haptic feedback in response to the input detected via the strain gauge.

21. The keyboard of claim 17, wherein the electrical interface is configured to:
transfer power from an external device to the capacitor bank;
transfer data between the keyboard and the external device; and
provide magnetic coupling to the external device.

* * * * *